United States Patent
Goldman-Shenhar et al.

(10) Patent No.: US 10,106,173 B2
(45) Date of Patent: Oct. 23, 2018

(54) SYSTEMS AND METHODS OF AN ADAPTIVE INTERFACE TO IMPROVE USER EXPERIENCE WITHIN A VEHICLE

(71) Applicant: GM Global Technology Operations LLC, Detroit, MI (US)

(72) Inventors: Claudia V. Goldman-Shenhar, Mevasseret Zion (IL); Asaf Degani, Tel Aviv (IL); Omer Deutsch, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/327,521

(22) PCT Filed: Jul. 22, 2015

(86) PCT No.: PCT/US2015/041491
§ 371 (c)(1),
(2) Date: Jan. 19, 2017

(87) PCT Pub. No.: WO2016/014640
PCT Pub. Date: Jan. 28, 2016

(65) Prior Publication Data
US 2017/0174230 A1    Jun. 22, 2017

Related U.S. Application Data

(60) Provisional application No. 62/027,654, filed on Jul. 22, 2014, provisional application No. 62/030,853, filed on Jul. 30, 2014.

(51) Int. Cl.
*B60W 50/10*        (2012.01)
*G10L 15/22*        (2006.01)
(Continued)

(52) U.S. Cl.
CPC ............ *B60W 50/10* (2013.01); *G06F 3/017* (2013.01); *G06F 3/16* (2013.01); *G10L 15/22* (2013.01); *G10L 2015/223* (2013.01)

(58) Field of Classification Search
CPC .......... B60W 50/10; G06F 3/017; G06F 3/16; G10L 15/22; G10L 2015/223
(Continued)

(56) References Cited

U.S. PATENT DOCUMENTS 5,926,790 A * 7/1999 Wright .................... G10L 15/22
704/275
6,570,495 B1 * 5/2003 Lavelle .................. H04B 1/082
340/425.5
(Continued)

OTHER PUBLICATIONS

International Search Report and Written Opinion dated Oct. 23, 2015 for related PCT Patent Application No. PCT/US2015/041491.

*Primary Examiner* — Tyler J Lee
(74) *Attorney, Agent, or Firm* — Cynthia R. Parks; Parks IP Law LLC

(57) ABSTRACT

The present disclosure relates to a computer-readable device cause a processor to perform operations for interpreting a user request, such as a tactile inputs, gestures, and speech, to a vehicle system. The operations include receiving an input data package comprising user communications. The operations then determine using a human-machine interface whether the input data package contains an implicit user request or an explicit user request. The operations also assign a level of abstraction to the control language data set. Also disclosed are methods for receiving, interpreting, and storing a user request at one or more levels of abstraction.

20 Claims, 3 Drawing Sheets

(51) Int. Cl.
*G06F 3/01* (2006.01)
*G06F 3/16* (2006.01)

(58) Field of Classification Search
USPC .......................................................... 701/36
See application file for complete search history.

(56) References Cited

U.S. PATENT DOCUMENTS

| | | | | |
|---|---|---|---|---|
| 7,020,544 | B2* | 3/2006 | Shinada | G01C 21/3641 |
| | | | | 701/1 |
| 7,681,201 | B2* | 3/2010 | Dale | G06F 9/545 |
| | | | | 701/31.4 |
| 8,407,057 | B2* | 3/2013 | Comerford | G10L 15/22 |
| | | | | 704/246 |
| 9,811,935 | B2* | 11/2017 | Filev | G06T 13/40 |
| 2003/0065427 | A1* | 4/2003 | Funk | G01C 21/3608 |
| | | | | 701/1 |
| 2007/0130523 | A1 | 6/2007 | Ku et al. | |
| 2008/0249780 | A1* | 10/2008 | Nakashima | G10L 13/00 |
| | | | | 704/270 |
| 2008/0269958 | A1 | 10/2008 | Filev et al. | |
| 2009/0192705 | A1 | 7/2009 | Golding et al. | |
| 2010/0185445 | A1* | 7/2010 | Comerford | G10L 15/22 |
| | | | | 704/251 |
| 2010/0253918 | A1* | 10/2010 | Seder | G01S 13/723 |
| | | | | 353/13 |
| 2012/0212353 | A1* | 8/2012 | Fung | B60K 28/06 |
| | | | | 340/905 |
| 2013/0226408 | A1* | 8/2013 | Fung | B60W 40/09 |
| | | | | 701/41 |
| 2015/0286952 | A1* | 10/2015 | El Dokor | G06N 99/005 |
| | | | | 701/1 |
| 2015/0310865 | A1* | 10/2015 | Fay | G10L 15/22 |
| | | | | 704/254 |

* cited by examiner

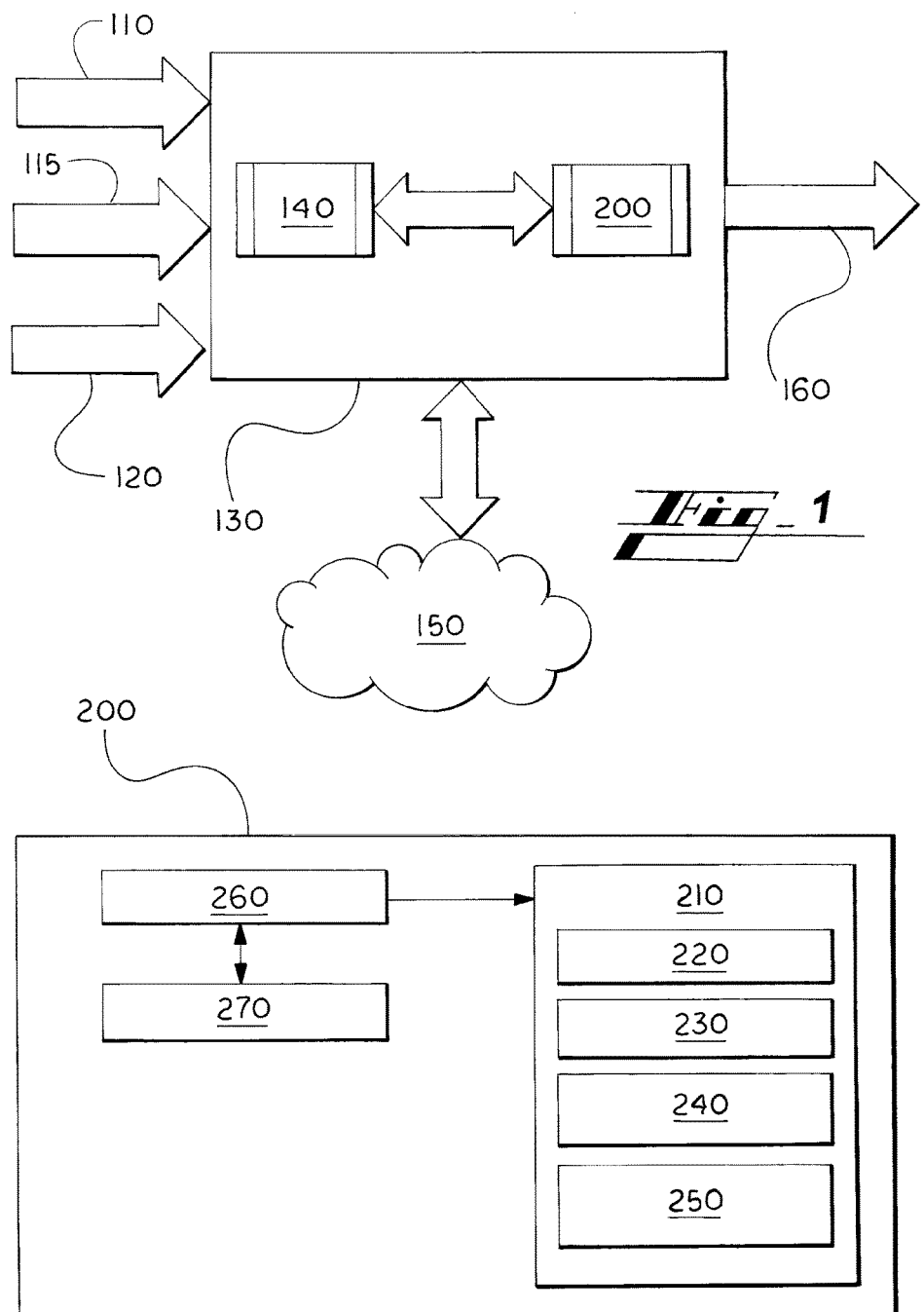

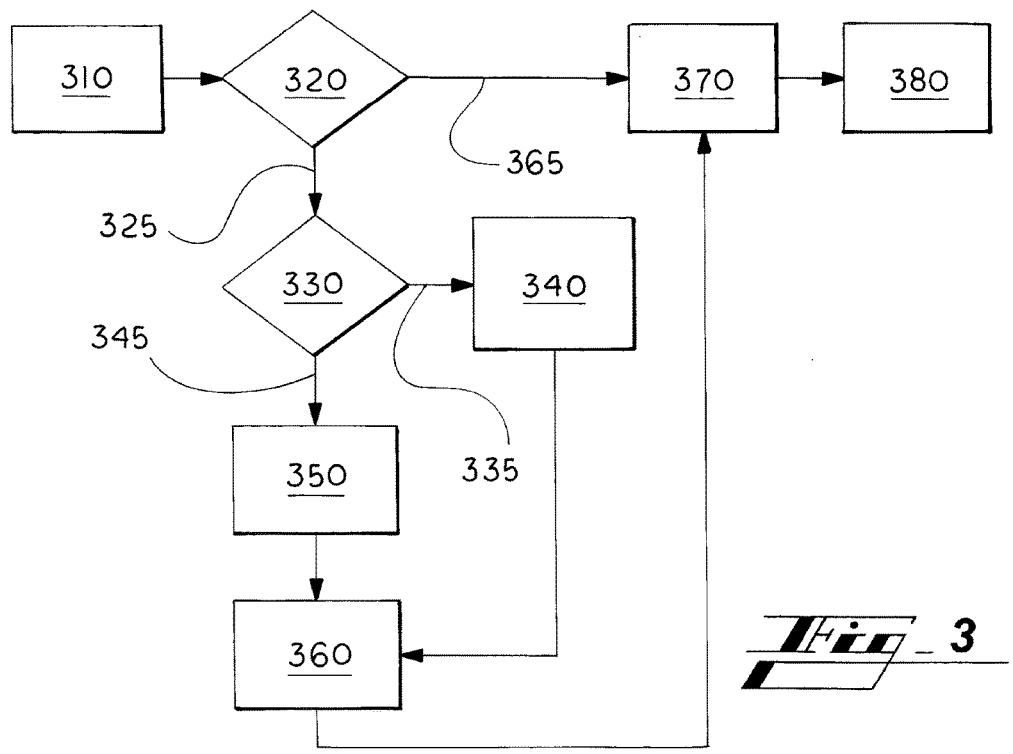
Fig_3
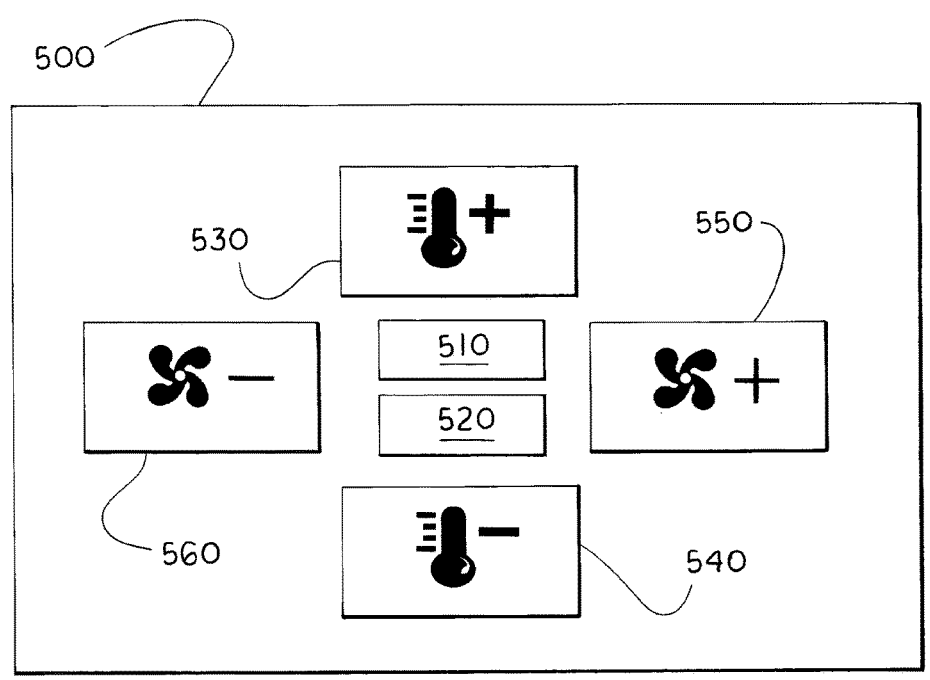
Fig_5

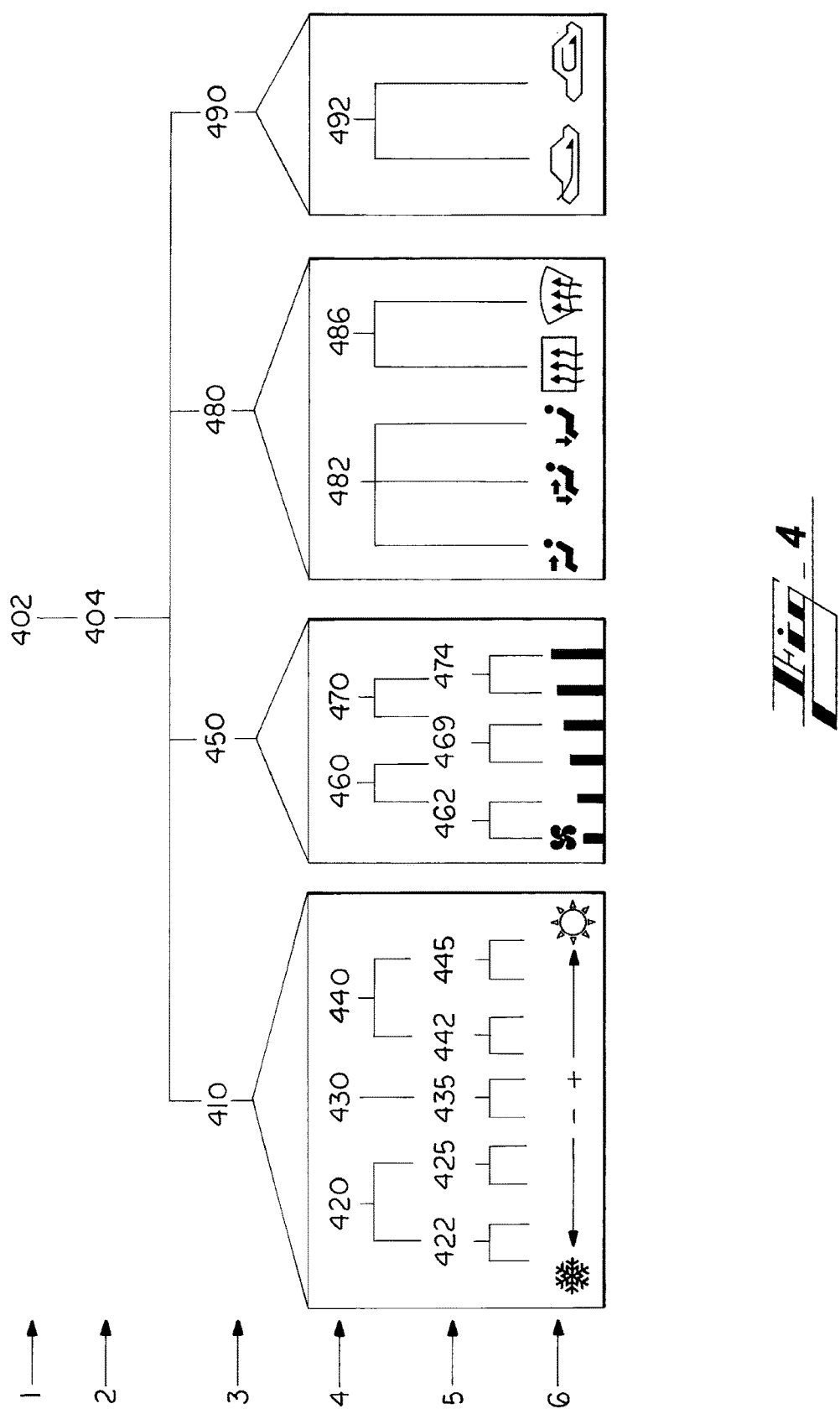

SYSTEMS AND METHODS OF AN ADAPTIVE INTERFACE TO IMPROVE USER EXPERIENCE WITHIN A VEHICLE

CLAIM OF PRIORITY

This application claims priority to U.S. Patent Application Nos. 62/027,654 and 62/030,853, filed Jul. 22, 2014 and Jul. 30, 2014, respectively.

TECHNICAL FIELD

The present disclosure relates generally to systems and methods of an adaptive human-machine interface (HMI) to enhance user experience. More specifically, the present disclosure relates to an HMI configured to alter systems within a vehicle.

BACKGROUND

A driver's experience in a vehicle, including communication between the vehicle and the driver, affects how well the driver operates the vehicle. Often vehicle systems and subsystems are programmed such that a driver can operate the systems through the use of applications, which can be pre-integrated to an onboard computer by manufacturers or downloaded through a human-machine interface (HMI).

In many vehicles, HMI systems are designed to promote user interaction at a center stack of a vehicle where controls include a variety of input components including hard buttons and knobs and/or soft buttons on a touch-sensitive screen. The controls provided for HMI interactions provide the driver a way of conveying a desire for a change in the vehicle conditions—e.g., change of air conditioning or radio station—to the HMI system.

However, current HMI systems include predesigned programming that is generally universal amongst a wide array of vehicles. Often these universally designed HMI systems do not logically anticipate the driver's way of thinking and interacting. As a result, these conventional systems perceive user input differently than the user's intentions. The variance leads to user frustration and inefficient and otherwise ineffective use of the systems.

SUMMARY

A need exists in the industry to improve the driver's experience in a vehicle by allowing a user to interact with the vehicle via a novel HMI in a manner natural to a human.

The present technology relates to systems and methods to improve driver experience via an adaptive interface based HMI system. The present technology addresses the need in the industry to improve the driver's experience in a vehicle by understanding the driver's actual desires and intentions (e.g., an implicit response or statement), including when they are different from an actual response or statement— e.g., an explicit response or statement. Furthermore, the present technology allows for rearrangement of the interface system parameters according to human needs and understanding.

An adaptive interface (AI) type of HMI system computes its behavior based on the underlying (implicit) user requests. Implicit user inputs may need to be interpreted and translated into a specific task to be performed by one or more vehicle systems to fulfil an essence of the user input. In contrast, conventional HMI systems respond to only explicit user inputs. Explicit user inputs are associated in the conventional HMI systems to specific tasks that does not need to be interpreted for being actionable at other vehicle systems.

In one aspect, the technology includes a system comprising graphical display/control language that provides building blocks (content and format) suitable to acquire and interpret implicit user requests being at any of numerous levels of abstraction. The graphical language generates adaptive user interfaces, which enable the user request at different levels of abstractions.

The technology also comprises a computational method to change user interfaces based on any of (1) user needs (e.g., a need to modify internal temperature of the vehicle), (2) machine behaviors (e.g., failures, operating limits, and reconfigurations), and (3) environmental changes and demands (e.g., a need to turn on windshield wipers when rain begins). The method supports interaction between the user and the system by translating the user's needs into input values for the system affected by the interface. The method also supports functionality to choose a user interface either statically or dynamically.

DESCRIPTION OF THE DRAWINGS

FIG. 1 illustrates schematically a functional system in accordance with an exemplary embodiment.

FIG. 2 is a block diagram of a controller of the functional system in FIG. 1.

FIG. 3 is a flow chart illustrating methods for performing an output command sequence in accordance with an exemplary embodiment.

FIG. 4 illustrates an exemplary embodiment of abstraction levels within of the functional system of FIG. 1 as related to a heating, ventilation, and air conditioning (HVAC) system.

FIG. 5 illustrates an exemplary control panel for human interface to the HVAC system of FIG. 4.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, buildings (e.g., homes, apartments, hotel rooms), and consumer electronic components.

I. Overview of the Disclosure—FIGS. 1 and 2

Now turning to the figures, and more particularly the first figure, FIG. 1 illustrates a functional system 130 including an adaptive human-machine interface (AHMI) 140 and a controller 200.

The functional system 130 is configured to receive, from a user, inputs that are translated to functions to affect operations of vehicle system(s) being monitored. In various embodiments the inputs include behavioral inputs, such as user gestures, touch, speech, or other emoting or communications (e.g., sighing). The vehicle systems include any of a wide variety of systems, such as a heating system, an air conditioning system, a braking system, an acceleration system, an entertainment or infotainment system (e.g., a radio and/or video playing system), a navigation system, a mirrors system (e.g., mirror adjustment systems), a seat system (e.g., seat adjustment systems), a window-control system, a door system (e.g., door lock control systems), a collision-avoidance system, a traction-control system, a horn system, a windshield-wiper system, a belt and/or hose system, an emission system, an engine, an engine-cooling system, an exhaust system, a lighting system, a wiper system, a vehicle-starting system, a charging system, a battery system, a steering system, a suspension system, transmission system, a switch system, an HVAC system, a camera system, communication devices (e.g., OnStar devices and other wired or wireless communication devices), systems that connect to auxiliary devices (e.g., Bluetooth devices, cellular phones), a cluster system, a center stack system, a heads-up display (HUD) system, a speech system, a gesture system, a sound system, or other systems of a vehicle.

A driver state or passenger state, collectively user state, is a directly measured parameter that is identified from a measured parameter (e.g., information perceived and communicated by vehicle sensors). The user state is input into the functional system 130 as user inputs 110. The user inputs 110 may also contain direct user interaction with systems of the vehicle (e.g., turning the radio to a desired station, adjusting the temperature settings within the vehicle).

The user inputs 110 may also contain data gathered from a state (e.g., cognitive state) displayed by the vehicle driver, referred to as a driver or user state. The user state is determined based on driver behavior (e.g., dissatisfaction with a particular system or distraction from the road), physiology (e.g., cognitive overload, fatigue), and the like that the system can recognize through analysis of measurements of parameters such as heart rate, driving time, steering behavior, galvanic skin response, Electroencephalography (EEG), driving behavior, speech detection, combinations thereof, and the like.

The user input 110 may be received by the AHMI 140 within the vehicle, including, specific inputs into a center stack console of the vehicle made by the user. Input devices can include microphones, light-based sensors (e.g., sensors using laser), buttons, knobs, touch-sensitive displays, and/or other touch-sensitive devices. For example, user input 110 includes an entries into a control panel or other input devices that suggest preferences such as temperature control, semi-automated vehicle speed (e.g., cruise control), radio station inputs, seat position, and steering wheel angle.

In some implementations, the vehicle inputs 115 comprise data gathered from one or more vehicle systems or subsystems that contain information about the structure and function of the vehicle systems, among others. The vehicle inputs 115 may include data perceived by sensors, actuators, or other input devices that provide information about conditions internal to the vehicle or external to the vehicle. For example, the vehicle inputs 115 include data received from a sensor measuring external vehicle temperature that is compared to temperature control inside the vehicle during the same time period. For example, when a sensor measures an external vehicle temperature is 90° F., a corresponding temperature of 65° F. within the vehicle, may be requested by the user. Inputs provided by the user are referred to primarily herein as requests.

The inputs can include explicit or implicit commands or requests for vehicle function, such as changing cabin temperature. The term requests is not necessarily limiting and can refer to implementations in which the user input does not contain a request per se. The input may include, for instance, a driver sighing and wiping their brow because it is warm or hot in the vehicle. The driver may not be thinking that the system will interpret their communication as a request, or communicated need. The driver may not even be aware that the system can do so or that the communication was made.

In some embodiments, inputs to the AHMI 140 include environmental inputs 120. The environmental inputs 120 can be measured by control sensors or other measuring devices (not shown) located internal or external to the vehicle.

The measuring devices capture phenomena, events, or incidents (collectively measured characteristics) and generate output data indicative of the captured characteristics. Measured characteristics include system characteristics of the vehicle systems and environmental characteristics from an environment (inside or outside) of the vehicle. Environmental characteristics (e.g., sound in the vehicle, distance to objects around the vehicle) relate to the environment associated with the vehicle system characteristics. These environmental characteristics reflect the status or performance of the vehicle systems.

Similarly, control sensors capture user input actions made using control mechanisms for the vehicle systems and user-state sensors measure user state characteristics. Example control mechanisms include receiving and executing user inputs into a control stack or other feedback mechanism provided by the vehicle.

Control sensors can capture environmental conditions through, for example, temperature sensors, traffic sensors, road type (e.g., highway, urban) sensors, weather (e.g., rain) sensors, occupancy sensors, cameras that measure distance to an object, a microphone, the like, and other.

As provided, the sensors can measure any of a wide variety of phenomena or characteristics. Sensors can measure, vehicle conditions as further example, ignition position or states of the vehicle, whether the vehicle is being turned off or on, whether or to what degree the vehicle is within a distance of a location, a type of weather (e.g., rain), a level of weather (e.g., amount of rain), an outside temperature, an outside humidity, an outside wind temperature, a cabin temperature, a vehicle speed, occupancy of a seat in the vehicle, weight of an occupant of a seat in the vehicle (e.g., to identify occupancy and distinguish between a child and adult), who is in the cabin (e.g., as identified by the presence of auxiliary devices that are specific to a user), vehicle state (e.g., amount of gas in the tank, cabin temperature, amount of oil), user state (e.g., how long the driver has been driving and the quality of the driving (e.g., driving vehicle erratically)), general conditions (e.g., weather, temperature, day, time), driving conditions (e.g., road type, traffic), the like, and other.

The AHMI 140 includes software and/or hardware components that can include an integrated processor for processing the software. Additionally or alternatively, the AHMI 140 can be in communication with a separate processor (e.g., controller 200) that processes the software.

The AHMI 140 is configured to determine an interface (e.g., a graphical language) that may be presented to the user and how the interface should be structured. The AHMI 140 may determine structure of the interface either statically or dynamically by receiving the user inputs 110, vehicle inputs 115, and environmental inputs 120 (collectively an input data package) from measuring devices associated with the vehicle which are recognized by either a user behavior model and/or a machine state model (not shown). The AHMI 140 comprises a graphical display/control language that provides building blocks (content and format) suitable to recommend a solution to or execute a solution for the user at any of numerous levels of abstraction.

Using the inputs 110, 115, and 120, the interface may generate one or more adaptive user interfaces that enable the user to execute a request using varying levels of abstraction. The inputs 110, 115, and 120 may be communicated to the controller 200 to form parameters for the levels of abstraction which are used to provide one or more output commands 150 to a vehicle system.

Parameters are specific characteristics within a vehicle system used to describe components or functionality within the system. For example, parameters associated with an infotainment system may include parameters such as display brightness, among others.

Levels of abstraction are associated with each defined parameter within the vehicle system. Any defined parameter may include low levels of abstraction ($L^1$), up to higher levels of abstraction ($L^n$). Each level of abstraction is defined in terms of commands presented to the user.

The user commands presented may become increasingly abstract as the levels increase. For example, $L^1$ is the most specific level and $L^n$ is the most abstract user feedback level. Alternatively, the user commands presented may become increasing specific as the levels increase. For example, $L^1$ is the most abstract level and $L^n$ is the most specific user feedback level. As another example, the user can change the levels to become more specific from $L^n$ to $L^1$.

For example, in a video infotainment system, with display brightness being a relevant parameter, a low level of abstraction may be the user selecting (e.g., tactically or verbally) a number 1, . . . , 20 where 1 is a lowest brightness setting of the video display and 20 is a highest brightness setting of a video display. In the same example, a higher level of abstraction may include the user providing verbal or tactile instructions to adjust the brightness of the display. The user may state "Make display brighter" or select a scale with which to adjust the display brightness. Yet a higher level of abstraction may include the vehicle system automatically adjusting the display brightness based on the time of day (e.g., increasing the display brightness at night) to anticipate needs of the user. At another high level of abstraction, the user may formulate a general statement such as "I feel uncomfortable" in the case of a climate control system or "I cannot see well" in the case of a video system, or by making a gesture, such as wiping their brow, and/or a sound, such as "whew," indicating to the system that the temperature and/or humidity should be adjusted.

The aforementioned examples, illustrate how with each increasing level of abstractness, interaction of the user with the system becomes more general and vague. However the AHMI 140 can use previous user inputs 110, vehicle inputs 115, and/or environmental input 120 to determine the meaning a general or vague user statement or other user input.

Potential implementations of the AHMI 140 are discussed below in association with FIGS. 3-5.

The functional system 130 also includes the controller 200, illustrated in FIG. 2. The controller 200 in various embodiments include a microcontroller, microprocessor, programmable logic controller (PLC), complex programmable logic device (CPLD), field-programmable gate array (FPGA), or the like. The controller 200 may be developed through the use of code libraries, static analysis tools, software, hardware, firmware, or the like. Any use of hardware or firmware includes a degree of flexibility and high-performance available from an FPGA, combining the benefits of single-purpose and general-purpose systems. After reading this description, it will become apparent to a person skilled in the relevant art how to implement the technology using other computer systems and/or computer architectures.

The controller 200 includes a memory 210. The memory 210 may include several categories of software and data used in the integrated device 220, including, applications 220, a database 230, an operating system (OS) 240, and I/O device drivers 250.

As will be appreciated by those skilled in the art, the OS 240 may be any operating system for use with a data processing system. The I/O device drivers 250 may include various routines accessed through the OS 240 by the applications 220 to communicate with devices and certain memory components.

The applications 220 can be stored in the memory 210 and/or in a firmware (not shown) as executable instructions and can be executed by a processor 260. The applications 220 include various programs that, when executed by the processor 260, process data received into the AHMI 140. The controller 200 and AHMI 140 can be related in any of a variety of ways. The controller 200 can be a part of the AHMI 140, for instance, or vice versa. Or the controller and AHMI can be separate components in communication with each other for performing functions described herein.

The applications 220 may be applied to data stored in the database 230, such as the specified parameters, along with data, e.g., received via the I/O data ports 250. The database 230 represents the static and dynamic data used by the applications 220, the OS 240, the I/O device drivers 250 and other software programs that may reside in the memory 210.

While the memory 210 is illustrated as residing proximate the processor 260, it should be understood that at least a portion of the memory 210 can be a remotely accessed storage system, for example, a server on a communication network, a remote hard disk drive, a removable storage medium, combinations thereof, and the like. Thus, any of the data, applications, and/or software described above can be stored within the memory 210 and/or accessed via wireless or network connections to other data processing systems (not shown) that may include a local area network (LAN), a metropolitan area network (MAN), or a wide area network (WAN), for example.

It should be understood that FIG. 2 and the description above are intended to provide a brief, general description of a suitable environment in which the various aspects of some embodiments of the present disclosure can be implemented. While the description refers to computer-readable instructions, embodiments of the present disclosure can also be implemented by modules performing functions of one or more programs of the instructions, or implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations including single-processor or multiprocessor systems, minicomputers, mainframe computers, personal computers, hand-held computing devices, microprocessor-based, programmable consumer electronics, combinations thereof, and the like.

Referring back to FIG. 1, each user request can be recognized by the functional system 130 and an associated query corresponding to the request can be constructed and optionally communicated and housed within storage (e.g., a cloud server), internal or external to the functional system 130.

A storage 150 can store personalized services and output commands 160 based on the specific behavior of the user (e.g., inform the user about repetitive problems through mobile services). Stored data can include actual behavior of a specific user, sequences of behavior of the specific user, and the meaning of the sequences for the specific user, among others.

The data housed within the storage 150 may be stored and/or transmitted as a computer-readable code. The storage or mode of transport can include any known computer readable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). The data housed within the storage 150 can be transmitted, by a processor to and from the controller 200.

In some embodiments, the storage 150 aggregates and stores data derived from a community of drivers whose behaviors are being monitored by the system. Having a community of drivers allows the storage 150 to be constantly updated with aggregated queries, which can be communicated to the controller 200 via the signal. The queries stored to the storage 150 can be used to provide personalized services and output commands 160 based on large data logged from multiple users. The queries data can be transmitted by a processor to and from the controller 200.

Output commands 160 are instructions formed by the AHMI 140 that execute a desired command of the user. Specifically, the AHMI 140 outputs a command or sequence of commands to vehicle systems that activate based on the user command. For example, the output command 160 is the activation of a particular vehicle system or subsystem.

The output commands 160 can be in the form of a recommendation to the user. Recommendations contain personalized aid for the user in executing a request. The recommendations is communicated to the user by one or more output devices that provide information by visual, auditory, or tactile interfaces to a vehicle occupant about changing vehicle conditions (e.g., changing position of objects detected in a surrounding environment). For example, the output device may display text or video to a monitor within the vehicle or text instructions to a mobile device when the vehicle is no longer moving. As another example, the output component may provide audio speaking instructions from components within the vehicle (e.g., speakers).

The functional system 130 can include and/or be in communication with any one or more other devices and components for performing functions of the system 130. For example, multiple controllers 200 may be used to recognize behavior and produce adaptive sequences.

II. Methods of Operation—FIG. 2

FIG. 3 is a flow chart illustrating algorithms, or methods, for performing a functional sequence. The term method is used primarily herein for simplicity. The method may be performed by the controller 200 described above.

The method begins with the functional system 130 perceiving the request of the user at step 310. The user request can be perceived by a combination of hardware (e.g., microphones and speakers) and software (e.g., voice recognition software) to determine when a user would like (e.g., requests) or would benefit from assistance or operation of the functional system 130.

Next, at step 320, the processor 260 determines if the request made by the user is recognized by the system 130 as a request that has been previously stored at a level of abstraction.

In some implementations, the system 130 has previously stored a type of user request, or need, the storing function being indicated by path 365 in FIG. 3. In later iterations of the method 300, the system 130 can use the stored request. If the request was stored, the system 130 will be able to recall from a memory (e.g., storage 150), an associated level of abstraction corresponding to the request. In some embodiments, the system 130 has stored the request in association with an appropriate command or function. Where the user request is in the form of a tactile input (e.g., user touches a button on a display) or another input (e.g., speech or gesture), the options presented to the user are associated with a level of abstraction predetermined by the system 130. Specifically, the user input corresponds exactly to one or more commands that the system 130 has determined or determines in real time to execute in such situations. For example, where the user touches a button on a display to select a fan level equal to one (e.g., lowest fan speed), one or more systems execute the user command. In some embodiments, at levels of abstraction not as detailed, an intelligent system (not described), separate and distinct from the system 130 would interpret the user input and determine the actual commands to be executed based on the determined level of abstraction.

Where the level of abstraction of a previously stored user request is predetermined, and associated in the system 130 with the user request, the user can subsequently move among the levels of abstraction. The user having the ability to move among the levels of abstraction is beneficial where the user is concentrating on a task (e.g., driving, talking on a phone), and cannot focus specifically on the output commands 160 provided by the AHMI 140.

For example, the where $L^1$ is the most abstract or the most specific level, the user can move among other levels of abstraction $L^2 \ldots L^n$. Specifically, when the user is concentrating on a task (e.g., driving, taking a phone call), the user request or command may be relatively abstract (e.g., a lower level of abstraction where $L^1$ is the most abstract level and $L^n$ is the most specific user feedback level). However, when the user has more time or attention with which to interact with the interface, the user command may be more specific.

The system 130 is configured in some embodiments to adjust the levels of abstraction automatically (e.g., to account for weather conditions). For example, the system 130 can present (e.g., on a display) commands to the user having an increased abstract level of abstraction where the user is concentrating on a task or present commands to the user having a more specific level of abstraction where the user has more time to interact.

In some implementations, the system 130 has not previously stored a type of user request, or need, the storing function being indicated by path 325 in FIG. 3. If the user request was not stored, the system 130 does not recall from a memory (e.g., storage 150), a level of abstraction based for the user request. For example, where the user request is in the form of verbal speech or a gesture, the user can express himself naturally, and the system 130 can store previous user requests thereby learning the levels of abstractions of such user requests.

Where the user request is made using hardware (e.g., buttons or touchscreens) and/or graphical interfaces or previously stored speech and/or gestures, the system 130 knows the level of abstraction of the user inputs. Based on this level of abstraction, a system determines what sequence of commands will be sent to the vehicle systems and subsystems for execution. In one embodiment, another intelligent system, distinct from the functional system 130, determines what sequence of commands will be sent to the vehicle systems and subsystems for execution.

When a request has not been previously stored, the method then determines if the request made by the user is an implicit request or an explicit request as recognized by the functional system 130 at step 330.

If the user request is implicit (e.g., path 335), the functional system 130 may need to understand the level of abstraction and process the user input so that the input can be translated into system commands that can be executed. Specifically, the functional system 130 can translate the implicit request into control language (e.g., computer-readable code processed by the controller 200) at step 340 based on inputs to the functional system 130, such as from user inputs 110, vehicle inputs 115, and environmental inputs 120.

The processor 260 generates control language based on user interface either statically or dynamically by receiving the inputs 110, 115, and 120. Where the user interface is static, the user requests when he desires to change the interfaces with different levels of abstractions. Where the user interface is dynamic, the user requests change to a level of abstraction of at least one part of the interface, or the user can browse interfaces with different levels of abstraction.

Dynamic interfaces can change also automatically when the system 130 changes the interface shown to the user based on the context and how it affects the predicted level of abstraction needed by the user. As an example of dynamic generation, if the user request states "I am uncomfortable," the functional system 130 may analyze data receive by temperature sensors on the vehicle to determine if the temperature within the vehicle greatly differs from the temperature outside the vehicle. As another example of dynamic generation, the functional system 130 may analyze recent user behaviors to determine how to classify the user request.

If the user request is an explicit request (e.g., path 345), the functional system 130 can associate (e.g., map) the request at step 350 into a command or set of commands that are executed by the functional system 130. As an example, if the implicit request of the user request is associated with infotainment options, the functional system 130 would generate control language associated with functions such as, but not limited to, functions for controlling a radio, the internet, or a mobile device.

At step 360, the processor 260 may store (e.g., within the storage 150) the control language (e.g., request of the user or the actual sequence of commands) translated from implicit and/or explicit requests, at steps 340 and 350, respectively, at a level of abstraction determined statically or dynamically by the system 130.

At step 320, if the user request is recognized (e.g., path 365), the control language stored at step 360 can be recalled by the system 130. One or more aspects of the control language, including, but not limited to, the associated level of abstraction associated with the control language, can be recalled and used to generate the output commands 160.

At step 380, the user request is executed by the system 130. For example, if the user interacts with a climate control system in the vehicle, the AHMI 140 executes or initiates a function determined to correspond to the implicit or explicit request of the user, such as to adjust the climate control system (e.g., adjusting a blower, compressor, temperature, air direction).

In some embodiments, one or more output commands 160 are presented to the user as options, allowing the user to select or approve an action corresponding to the user request.

It should be understood that the steps of the methods are not necessarily presented in any particular order and that performance of some or all the steps in an alternative order, including across these figures, is possible and is contemplated.

The steps have been presented in the demonstrated order for ease of description and illustration. Steps can be added, omitted and/or performed simultaneously without departing from the scope of the appended claims. It should also be understood that the illustrated method or sub-methods can be ended at any time.

In certain embodiments, some or all steps of this process, and/or substantially equivalent steps are performed by a processor, e.g., computer processor, executing computer-executable instructions, corresponding to one or more corresponding algorithms, and associated supporting data stored or included on a computer-readable medium, such as any of the computer-readable memories described above, including the remote server and vehicles.

III. Exemplary Embodiments—FIGS. 4 and 5

FIG. 4 illustrates an exemplary embodiment of the functional system 130 as related to a heating, ventilation, and air conditioning (HVAC) system.

In these embodiments, parameters used can include options such as, but not limited to, desired vehicle temperature, power setting of fan, and air flow (e.g., source of air flow and circulation of airflow, external circulation or recirculation of air).

Within an HVAC embodiment, the AHMI 140 may contain levels of abstraction as subcategories of the parameters as established by the functional system 130.

The AHMI 140 may include any number of levels of abstraction ($L^1$, . . . , $L^n$) for each parameter. The levels of abstraction of each parameter may be independent from other parameters. More specifically, each parameter may have its own structured levels of extraction.

As an example, the AHMI 140 includes as the defined parameter temperature, fan level, air source, and air circulation, and there are up to n levels of abstraction. The AHMI 140 illustrated in FIG. 4 includes six levels of abstraction labeled 1, . . . , 6 along the left side of the figure. The levels of abstraction and user feedback, defined by reference numbers, may resemble, by way of non-limiting example, the following:

| | Temperature: | Fan Level: | Air source: | Air circulation: |
|---|---|---|---|---|
| $L^1$ | | Total Automated System (402) e.g., no user feedback provided | | |
| $L^2$ | | Non-Directional User Feedback (404) e.g., user states "I'm uncomfortable" | | |
| $L^3$ | Directional User Feedback e.g., "Change Temperature" (410) | Directional User Feedback e.g., "Change Fan" (450) | Directional User Feedback e.g., "Change Air" (480) | Directional User Feedback e.g., "Change Circulation" (490) |
| $L^4$ | Specific User Feedback e.g., "Colder" (420) e.g., "Maintain" (430) e.g., "Warmer" (440) | Specific User Feedback e.g., "Softer fan" (460) e.g., "Stronger fan" (470) | Specific User Feedback e.g., "Auto choose air delivery" (482) e.g., "Auto defog" (486) | Specific User Feedback e.g., "Auto choose air delivery" (482) |
| $L^5$ | Targeted User Feedback e.g., "Max Cool" (422) or "Sustain cool" (425) e.g., "maintain temperature" or "Fan only" (435) e.g., "Max Heat" (445) or "Sustain heat" (442) | Targeted User Feedback e.g., "Low fan" (462) e.g., "Medium fan" (469) e.g., "High fan" (474) | | |
| $L^6$ | Technical User Feedback e.g., "Increase the temperature to 70° F." | Technical User Feedback e.g., "Decrease the fan to level 4" | Technical User Feedback e.g., "Deliver air to vent" e.g., "Defog" or "Defrost" | Technical User Feedback e.g., "Recirculate" e.g., "Circulate Outside" |

As illustrated in the example of FIG. 4 and the above abstraction level chart, as the levels increase, the amount of specificity provided by the user into the AHMI 140 additionally increases.

At lower levels (e.g., $L^1$ and $L^2$) minimal information is provided by the user. Stated another way, information provided by the user is more abstract. Where minimal feedback is provided by the user, the AHMI 140 can provide follow up inquiries to the user to determine the desires of the user to enhance the user experience. In addition or alternatively, the AHMI 140 can access previous feedback provided by the user after similar requests. For example, where the user states "I'm uncomfortable," the AHMI 140 may provide a follow up voice inquiry (e.g., through vehicle speakers) or a tactical inquiry (e.g., through a control panel) requesting additional feedback from user to determine the proper course of action. The follow up request can inquire as to whether the user is uncomfortable with, for example, the temperature of the vehicle interior or the speed of the ventilation fan. Additionally or alternatively, the AHMI 140 may obtain additional information by accessing systems and subsystems within the vehicle.

At higher levels (e.g., $L^3$ and $L^4$), the user feedback to the AHMI 140 is directional or specific. Where directional or specific feedback is provided by the user, the AHMI 140 can provide follow up inquiries to the user to determine greater detail associated with the request. Follow up inquires can request information from the user and/or access previous feedback provided by the user after similar requests were provided. For example, where the user states "Change Temperature," the AHMI 140 may provide a follow up voice inquiry requesting additional feedback such as the requesting if the user would like to increase or decrease the temperature. Additionally or alternatively, the AHMI 140 may obtain additional information from systems and subsystems within the vehicle such as a user input that occurred after the last user request for changing the vehicle temperature.

At yet higher levels (e.g., $L^5$ and $L^6$), the user feedback is targeted or technical. Where user feedback is target or technical, the AHMI 140 may have enough information to adjust the system 130 in a manner to satisfy the user request. For example, where the user states "Extreme cooling," the AHMI 140 may interpret the request to mean the user would like the coolest air temperature available by the air conditioning system. The AHMI 140 may also or alternatively request additional feedback such as requesting the user identify a specific temperature. As another example, where the user states "Change the temperature to 65° F.," the AHMI 140 has technical information to know the exact desire of the user, and can accordingly adjust the temperature.

The user feedback, no matter the level of abstraction, can be received by the user directly from the system that to which the request is requested. For example, where the user request is to adjust the strength of air flow, the system and subsystems (e.g., blowers) that operates the temperature control will increase as the desired feedback.

Additionally or alternatively, user feedback, can be provided via any system internal or external to the vehicle. For example, user feedback can be verbally provided as voice command received by speakers in a vehicle, converted into one or more analog/digital signals, and communicated to a vehicle system/subsystem for execution. As another example, user feedback can be tactically provided via as a user input into a control panel, such as the example illustrated in FIG. 5.

Additionally or alternatively, the user feedback can be received directly from the system that to which the request is requested. For example, the blower will blow stronger.

FIG. 5 illustrates an example control panel 500 for receiving input from a user related to HVAC adjustments.

Such a panel could be displayed in a vehicle center stack using a visual display screen. Although the control panel 500 only displays particular parameters at particular levels of abstraction, the control panel may display any parameter at any level for the AHMI 140 embodiment.

As illustrated, the control panel 500 can be used to display the levels of abstraction for the particular parameters. The vehicle user may provide non-directional feedback as described at the second level of abstraction. For example, the controller displays a comfortable setting 510 or an uncomfortable setting 520. From there, the AHMI 140 may request further feedback at a higher level of abstraction.

As illustrated, the control panel 500 displays a portion the specific feedback from the user (e.g., $L^4$ illustrated in FIG. 4) as it relates to fan level and temperature settings. As an example, the controller displays an increase 530 in the interior temperature of the vehicle as well as a decrease 540 in interior temperature. As another example, the controller 500 displays a stronger fan speed 550 as well as a softer fan speed 560.

Additionally or alternatively, the user may provide the specific feedback as well as the non-directional feedback for future storage and processing by the AHMI 140. For example, the user may choose the stronger fan speed 550 and then choose the comfortable setting 510. This particular user interface may suggest that the user is comfortable at the selected fan setting. The AHMI 140 may use store the information and recall at a later time where the user only provides non-directional or other feedback at lower levels of abstraction.

The control panel 500 may additionally include high level abstraction, where all parameters can be aggregated into a summary statement (e.g., comfortable and uncomfortable settings).

In another embodiment, the AHMI 140 may relate to semi-automated driving, navigational systems, or otherwise safety systems.

In these embodiments, parameters used can include options such as, but not limited to, distance between the vehicle and another vehicle (gap), lane-offset, set speed of the vehicle, speed-sign, communication of speeds vehicle-to-vehicle and vehicle-to-infrastructure (V2X), vehicle wheel angle, curvature of the road, speed control of the vehicle, and distance between the vehicle and a lane on the road.

Within an semi-automated driving embodiment, the AHMI 140 may contain levels of abstraction ($L^1, \ldots, L^n$) for each parameter. The levels of abstraction of each parameter may be independent from other parameters. More specifically, each parameter may have its own structured levels of extraction.

As a non-limiting example, levels of abstraction within the semi-automated driving embodiment may include low levels of abstraction ($L^1$), technical levels of abstraction ($L^2$), default levels of abstraction ($L^3$), and/or high levels of abstraction ($L^4$).

|  | Gap: | Lane Offset: | Set Speed: | Road curvature: | Wheel Angle: |
|---|---|---|---|---|---|
| $L^1$ | Measured by time e.g., seconds | Measured by distance e.g., meters | Measured by velocity e.g., km/hr | Measured by velocity at a given angle | Measured by angle |
| $L^2$ | General e.g., closer to front car or further from front car | General e.g., to the left, to the right, or away from trucks | General e.g., faster, slower | General e.g., faster, slower | General e.g., more turn or less turn |
| $L^3$ | Automatic Mode on All Systems | Automatic Mode on All Systems | Automatic Mode on All Systems |  | Automatic Mode on All Systems |
| $L^4$ | User speech e.g., "Gap is uncomfortable" | User speech e.g., "Offset is uncomfortable" | User speech e.g., "Speed is uncomfortable" |  |  |

At the highest level ($L^n$), all parameters can be aggregated into a summary statement (e.g., user states "I feel uncomfortable").

In another embodiment, the AHMI 140 may relate to infotainment parameters such as a media (e.g., radio) or mobile device (e.g., cellular phone).

In media infotainment embodiments, parameters used can include options such as, but not limited to, radio station, radio volume, radio bandwidth, type of media devices (e.g., mp3, DVD, radio), and device settings (e.g., treble and bass of sound system).

As a non-limiting example, levels of abstraction within the media infotainment embodiment may include low levels ($L^1$), up to higher levels ($L^5$), each level of abstraction increasing in abstractness of commands presented by the user.

|  | Radio Station: | Radio Volume: | Bandwidth: | Type of device: | Device settings: |
|---|---|---|---|---|---|
| $L^1$ | Actual station frequencies e.g., 93.9, 107.5 | Quantitative level e.g., 1, . . . , 20 where 1 is the softest and 20 is the loudest | Type of bandwidth e.g., AM, FM, XM | Type of device e.g., MP3, DVD | Quantitative level e.g., set treble at 5 out of 10 |

-continued

| | Radio Station: | Radio Volume: | Bandwidth: | Type of device: | Device settings: |
|---|---|---|---|---|---|
| $L^2$ | Names e.g., stations saved in favorites | General e.g., higher, lower, softer, louder | | | |
| $L^3$ | Genre of music e.g., classical, no commercial | Automatic Mode on All Systems e.g., based on noise levels inside and outside the vehicle | | | Automatic Mode on All Systems |
| $L^4$ | User mood through speech e.g., "I am happy" | | | | |
| $L^5$ | General user speech e.g., "I don't like it" or "Surprise me" | | | | |

It should be noted that each parameter does not have all levels of abstractions. It should also be noted that parameters can define levels of abstraction that are not consecutive. For example, the device setting parameter has a low level of at $L^1$ and a higher level at $L^3$. However, the device setting parameter does not include an $L^2$.

In other embodiments, the AHMI 140 may contain levels of abstraction in association with infotainment options on a mobile device. In these embodiments, parameters can include options such as, but not limited to information stored within the mobile device (e.g., contact name, contact phone number), mobile device settings (e.g., volume of speaker), and interactive functionality (e.g., phone-pairing with Bluetooth).

As a non-limiting example, levels of abstraction within the mobile device embodiment may include low levels of abstraction ($L^1$), up to higher levels of abstraction ($L^n$), each level of abstraction increasing in abstractness of commands presented by the user.

| | Contact Name: | Volume of Speaker: | Speaker: | Phone Pairing: |
|---|---|---|---|---|
| $L^1$ | Actual Name e.g., John Smith | Quantitative level e.g., 0, . . . , 20 where 0 is mute and 20 is the loudest | Origination of sound e.g., Bluetooth, mobile device | Specific setting e.g., set device, set system |
| $L^2$ | Associations e.g., relatives, colleagues, service provider | General e.g., block calls | | General setting e.g., set device only |
| $L^3$ | | Automatic Mode on All Systems e.g., user states "I cannot hear" | Automatic Mode on All Systems | General user speech e.g., user states "pair now" without specifying device |

IV. Selected Features

Many features of the present technology are described herein above. The present section presents in summary some selected features of the present technology. It is to be understood that the present section highlights only a few of the many features of the technology and the following paragraphs are not meant to be limiting.

One benefit of the present technology is the system interprets actual intentions of the user. User intentions are sometimes implicit and not immediately identifiable by traditional systems designed to receive actual (explicit) responses. Traditional systems often do not recognize implicit intentions because the systems are predesigned for general use among an array of vehicles, not specific to a particular user.

Another benefit of the present technology is the system can be arranged according to parameters other than traditional engineering parameters. Specifically, the present technology is arranged according to human-based parameters. Basing the system on human-parameters allows the system to understand human needs, even where intentions are implicit.

V. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A computer-readable hardware storage device comprising instructions, which, when executed by a processor, cause the processor to perform operations, for interpreting a user request to a first tangible vehicle system, comprising:
receiving an input data package comprising a sequence of user communications comprising a cognitive state based on perceived behavior displayed by a user, a vehicle system data package comprising a vehicle condition internal to the vehicle, and an environmental measurement data package comprising at least one condition external to the vehicle;

determining, using a human-machine interface, that the input data package contains an implicit user request;

determining a level of abstraction corresponding to the implicit user request;

assigning the level of abstraction determined to the user request for subsequent use in controlling a second tangible vehicle system comprising a tangible vehicle device used to reflect the cognitive state of the user; and presenting, to the user at the vehicle device, a predetermined control selection based on the assigned level of abstraction and cognitive state of the user.

2. The device of claim 1, wherein the operations further comprise determining whether the implicit user request has been previously stored at the level of abstraction.

3. The device of claim 2, wherein, if the implicit request has been previously stored, the system can recall the level of abstraction based on the user request.

4. The device of claim 1, wherein the operations further comprise communicating the implicit user request to a destination vehicle hardware subsystem for execution.

5. The device of claim 1, wherein the level of abstraction is a first level of abstraction and the predetermined control selection comprises output commands based on the first level of abstraction and a second level of abstraction.

6. The device of claim 5, wherein the operations further comprise adjusting the output commands according to the first level of abstraction or the second level of abstraction and presenting the output commands adjusted for receipt by the user by way of a display device.

7. A computer-readable hardware storage device comprising instructions, which, when executed by a processor, cause the processor to perform operations, for interpreting a user request to a first tangible vehicle system, comprising:

receiving an input data package comprising a sequence of user communications comprising a cognitive state based on perceived behavior displayed by a user, a vehicle system data package comprising a vehicle condition internal to the vehicle, and an environmental measurement data package comprising at least one condition external to the vehicle;

determining, using a human-machine interface, that the input data package contains an explicit user request;

determining a level of abstraction corresponding to the explicit user request;

assigning, the level of abstraction determined to the user request for subsequent use in controlling a second tangible vehicle system comprising a tangible vehicle device used to reflect the cognitive state of the user; and presenting, to the user at the vehicle device, a predetermined control selection based on the assigned level of abstraction and cognitive state of the user.

8. The device of claim 7, wherein the operations further comprise determining whether the explicit user request has been previously stored at the level of abstraction.

9. The device of claim 8, wherein, if the explicit request has been previously stored the system can recall the level of abstraction based on the user request.

10. The device of claim 7, wherein the operations further comprise communicating the explicit user request to a destination vehicle hardware subsystem for execution.

11. The device of claim 7, wherein the level of abstraction is a first level of abstraction and the predetermined control selection comprises output commands based on the first level of abstraction and a second level of abstraction.

12. The device of claim 11, wherein the operations further comprise adjusting the output commands according to the first level of abstraction or the second level of abstraction and presenting the output commands adjusted for receipt by the user by way of a display device.

13. A method for interpreting a user request to a first tangible vehicle system, comprising:

receiving, by a system having a processor, an input data package comprising a sequence of user communications comprising a cognitive state based on perceived behavior displayed by a user, a vehicle system data package comprising a vehicle condition internal to the vehicle, and an environmental measurement data package comprising at least one condition external to the vehicle;

determining the user request is implicit where the system requires additional information to execute the user request, determining the user request is explicit where the system may directly execute the user request and wherein the user request is implicit;

determining a level of abstraction corresponding to the implicit user request;

assigning, the level of abstraction determined to the user request for subsequent user in controlling a second tangible vehicle system comprising a tangible vehicle device used to reflect the cognitive state of the user; and presenting to the user at the vehicle device, a predetermined control selection based on the assigned level of abstraction and cognitive state of the user.

14. The method of claim 13, further comprises determining whether the explicit user request has been previously stored at the level of abstraction.

15. The method of claim 14, wherein the explicit request has been previously stored if the system recalls the level of abstraction based on the user request.

16. The method of claim 14, wherein the explicit request is stored at the level of abstraction determined by a classification of user input into the system.

17. The method of claim 13, further comprises determining whether the implicit user request has been previously stored at the level of abstraction.

18. The method of claim 17, wherein the implicit request has been previously stored if the system can recall the level of abstraction based on the user request.

19. The method of claim 17, wherein the implicit request is stored at the level of abstraction determined by a classification of user input into the system.

20. The method of claim 17, wherein the level of abstraction is a first level of abstraction and the predetermined control selection comprises commands based on the first level of abstraction and a second level of abstraction.

* * * * *